United States Patent
Hsu et al.

(10) Patent No.: US 7,071,662 B2
(45) Date of Patent: Jul. 4, 2006

(54) SYNCHRONIZED PARALLEL RUNNING POWER CONVERTER

(75) Inventors: Chien-Chi Hsu, Miaoli (TW);
Wen-Chi Hsieh, Banciao (TW);
Fu-Kang Cheng, Kaohsiung (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 289 days.

(21) Appl. No.: 10/805,948

(22) Filed: Mar. 22, 2004

(65) Prior Publication Data
US 2005/0052166 A1 Mar. 10, 2005

(30) Foreign Application Priority Data
Sep. 4, 2003 (TW) .............................. 92124503 A

(51) Int. Cl.
*G05F 1/59* (2006.01)
*H02M 3/158* (2006.01)

(52) U.S. Cl. ..................... 323/272; 323/282; 363/65
(58) Field of Classification Search ................ 323/271, 323/272, 282; 363/65, 71
See application file for complete search history.

(56) References Cited

U.S. PATENT DOCUMENTS

| | | | | |
|---|---|---|---|---|
| 5,808,453 A | * | 9/1998 | Lee et al. ..................... 323/224 |
| 5,973,485 A | * | 10/1999 | Kates et al. ................. 323/272 |
| 6,023,154 A | * | 2/2000 | Martinez ..................... 323/272 |
| 6,043,634 A | * | 3/2000 | Nguyen et al. ............... 323/272 |
| 6,150,803 A | * | 11/2000 | Varga .......................... 323/282 |
| 6,198,642 B1 | * | 3/2001 | Kociecki ........................ 363/37 |
| 6,281,666 B1 | * | 8/2001 | Tressler et al. .............. 323/272 |
| 6,285,571 B1 | * | 9/2001 | Brooks et al. ................. 363/65 |
| 6,346,798 B1 | * | 2/2002 | Passoni et al. ............... 323/272 |
| 6,362,607 B1 | * | 3/2002 | Wickersham et al. ........ 323/272 |
| 6,362,608 B1 | * | 3/2002 | Ashburn et al. ............. 323/272 |
| 6,424,129 B1 | * | 7/2002 | Lethellier ..................... 323/272 |
| 6,465,993 B1 | * | 10/2002 | Clarkin et al. ............... 323/272 |
| 6,605,931 B1 | * | 8/2003 | Brooks .......................... 323/272 |
| 6,674,274 B1 | * | 1/2004 | Hobrecht et al. ............ 323/285 |
| 6,696,882 B1 | * | 2/2004 | Markowski et al. ......... 327/531 |
| 6,768,658 B1 | * | 7/2004 | Perry ............................ 363/65 |
| 6,771,052 B1 | * | 8/2004 | Ostojic ......................... 323/266 |
| 6,850,045 B1 | * | 2/2005 | Muratov et al. ............. 323/272 |
| 6,977,489 B1 | * | 12/2005 | Isham .......................... 323/272 |
| 7,002,324 B1 | * | 2/2006 | Uematsu et al. ............. 323/272 |
| 7,002,325 B1 | * | 2/2006 | Harris et al. ................. 323/272 |

* cited by examiner

*Primary Examiner*—Jeffrey Sterrett
(74) *Attorney, Agent, or Firm*—Welsh & Katz, Ltd.

(57) ABSTRACT

In prior arts, additional pulse-width modulators and more costs are needed for increasing the current output. The invention provides a synchronized parallel running power converter. The power converter includes multiple power converters controlled by single-phase or double-phase pulse-width modulators. Each power converter includes a first pulse input port, a second pulse input port and a current output port. Each first pulse input ports are coupled, and each second pulse input ports are coupled also, so that each power converter is controlled by the same pulse signal and provide a same output current to be added as several times of current output.

20 Claims, 4 Drawing Sheets

SYNCHRONIZED PARALLEL RUNNING POWER CONVERTER

This Non-provisional application claims priority under 35 U.S.C. § 119(a) on Patent Application No. 092124503 filed in Taiwan on Sep. 4, 2003, the entire contents of which are hereby incorporated by reference.

BACKGROUND OF THE INVENTION

1. Field of the Invention

The invention generally relates to a power converter, and in particular relates to multiple power converters running in parallel and synchronously.

2. Related Art

In conventional power converters, parallel circuits are used to increase the current output while preventing from power loss and heat generation caused by current increasing on each circuit.

As shown in FIG. 1, a power converter of prior arts includes a pulse-width modulator 10, a first transistor TR1, a second transistor TR2 and an inductor L1. The drain terminal of the first transistor TR1 is connected to the power source Vdd. The source terminal of the first transistor TR1 is connected to the drain terminal of the second transistor TR2. The source terminal of the second transistor TR2 is connected to the ground. The pulse-width modulator 10 provides an oscillating pulse to the gates of the first and second transistors TR1, TR2 via a first resistor R1 and second resistor R2. When the pulse of the pulse-width modulator 10 is at the positive cycle, the first transistor TR1 is on and the second transistor is off; a current flows through the first transistor TR1 to the first inductor L1, as the illustrated path P1, and stored energy in the first inductor L1. When the pulse of the pulse-width modulator 10 is at the negative cycle, the first transistor TR1 is off and the second transistor is on; the first inductor L1 releases energy through a reversed path P2. Therefore, the first inductor L1 is charged and discharged corresponding to the pulse oscillation, and provides a stable current to a CPU 70. A capacitor C1 is connected between the power input and the ground of the CPU 70 for voltage regulation.

In the power converter circuit of FIG. 1, the inductor L1 provides a current I to the CPU 70. If the CPU 70 requires twice of current 2I, then another power converter has to be added in parallel as shown in FIG. 2, in which a third transistor TR3, a fourth transistor TR4, a third resistor R3, a fourth resistor R4 and a second inductor L2 are linked and function in the same way of FIG. 1. The current output of the first inductor L1 is I1. The current output of the second inductor L2 is I2. If I1=I2=I, then the total current output It=I1+I2=2I.

There is a limitation in the operation of the power converter of FIG. 2. That is, the pulse-width modulator 10 and the pulse-width modulator 20 have to work synchronously. Otherwise, the current outputs of the first inductor L1 and the second inductor L2 are unbalanced. Then, for a certain load of current It, one of the inductor L1 and L2 has to provide a larger current than the original current I that will cause overload of the components. For this problem, an additional current-balancing circuit has to be used for controlling the currents in both paths to the regular range.

As described above in FIG. 1 and FIG. 2, for controlling multiple power converters of prior arts, additional pulse-width modulators and current-balancing circuits are required, and the costs are increased accordingly. Therefore, it is a demand to have a simpler structure of power converter that has a lower cost for benefits to customers and the manufacturer.

SUMMARY OF THE INVENTION

The object of the invention is to provide a synchronized parallel running power converter. The power converter includes pulse-width modulators and power converters without other current-balancing circuit so as to save cost and remain the same electric characteristics of common power converters.

In a first embodiment of the invention, a synchronized parallel running power converter includes a first power converter and a second power converter controlled by a single-phase pulse-width modulator. The single-phase pulse-width modulator has a first pulse output port and a second pulse output port for pulse outputs. The first power converter includes a first pulse input port, a second pulse input port and a current output port. The first pulse input port is coupled to the first pulse output port of the single-phase pulse-width modulator. The second pulse input port is coupled to the second pulse output port of the single-phase pulse-width modulator.

In a second embodiment of the invention, a synchronized parallel running power converter includes a first power converter, a second power converter, a third power converter and a fourth power converter controlled by a double-phase pulse-width modulator. The double-phase pulse-width modulator has a first pulse output port, a second pulse output port, a third pulse output port and a fourth pulse output port for pulse outputs. The first power converter includes a first pulse input port, a second pulse input port and a current output port. The first pulse input port is coupled to the first pulse output port of the double-phase pulse-width modulator. The second pulse input port is coupled to the second pulse output port of the double-phase pulse-width modulator. The second power converter includes a first pulse input port, a second pulse input port and a current output port. The first pulse input port is coupled to the first pulse output port of the double-phase pulse-width modulator. The second pulse input port is coupled to the second pulse output port of the double-phase pulse-width modulator. The third power converter includes a first pulse input port, a second pulse input port and a current output port. The first pulse input port is coupled to the third pulse output port of the double-phase pulse-width modulator. The second pulse input port is coupled to the fourth pulse output port of the double-phase pulse-width modulator. The fourth power converter includes a first pulse input port, a second pulse input port and a current output port. The first pulse input port is coupled to the third pulse output port of the double-phase pulse-width modulator. The second pulse input port is coupled to the fourth pulse output port of the double-phase pulse-width modulator.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 1:
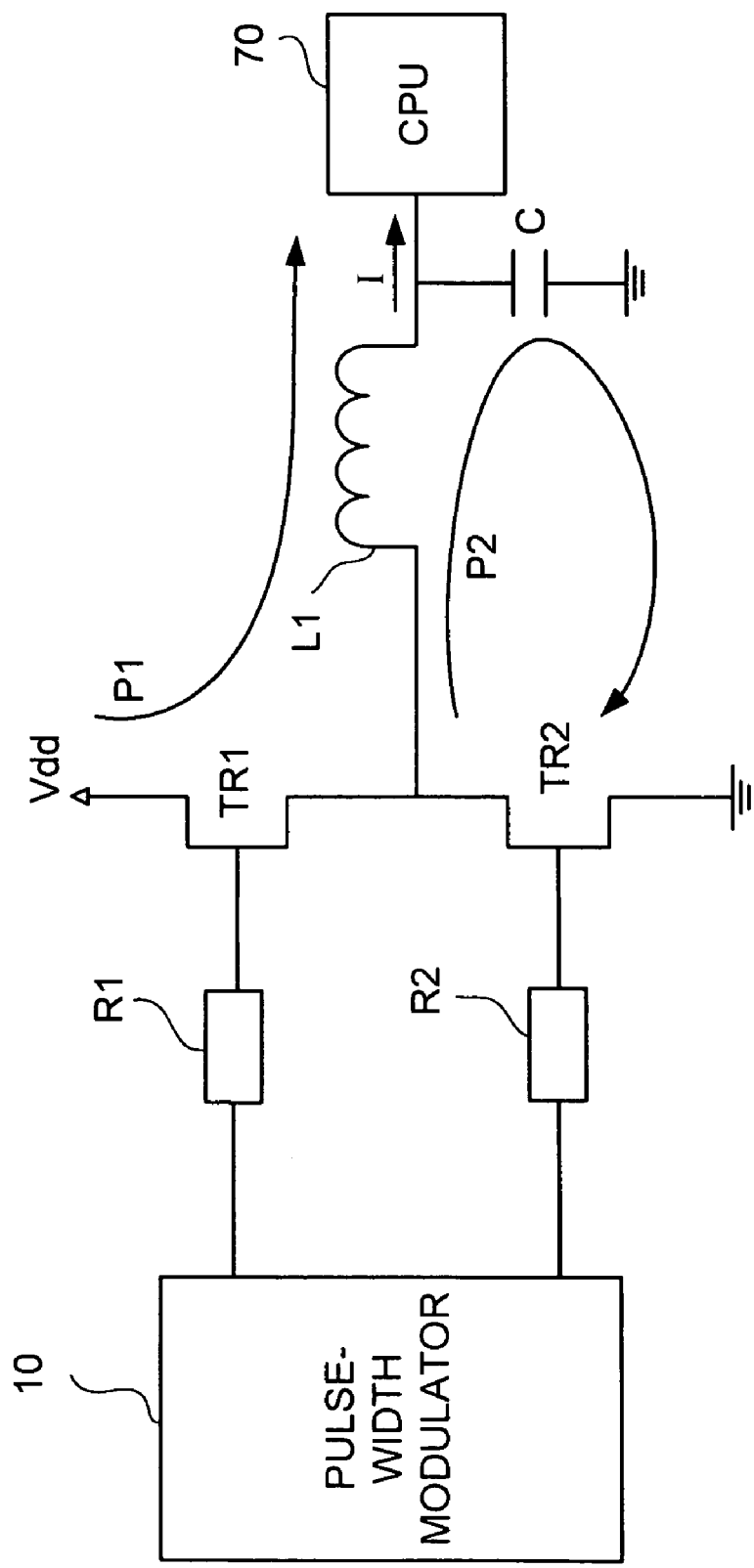
FIG. 1 is a circuit diagram of a power converter of prior arts.
Figure 2:
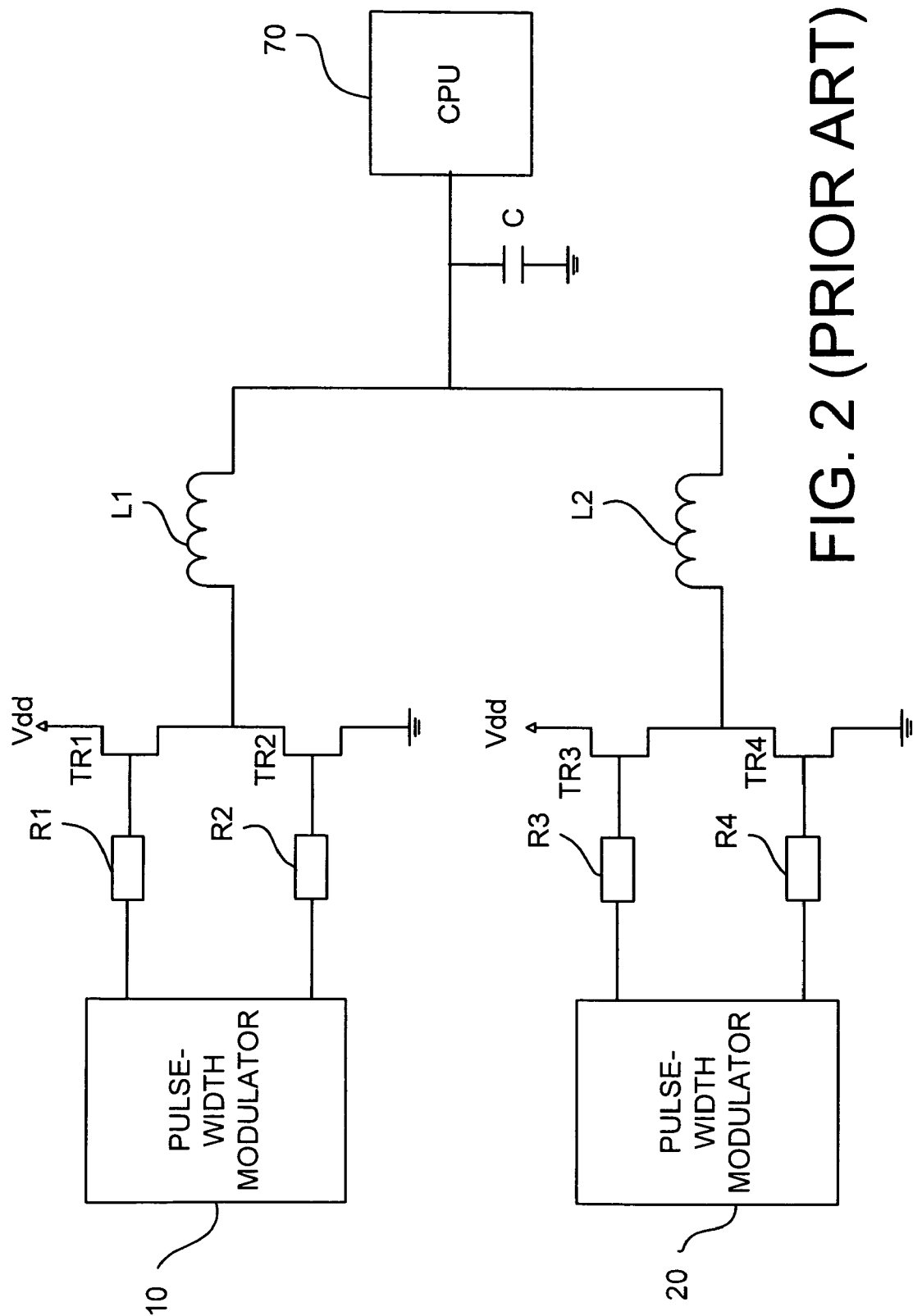
FIG. 2 is a circuit diagram of a multiple power converter of prior arts.
Figure 3:
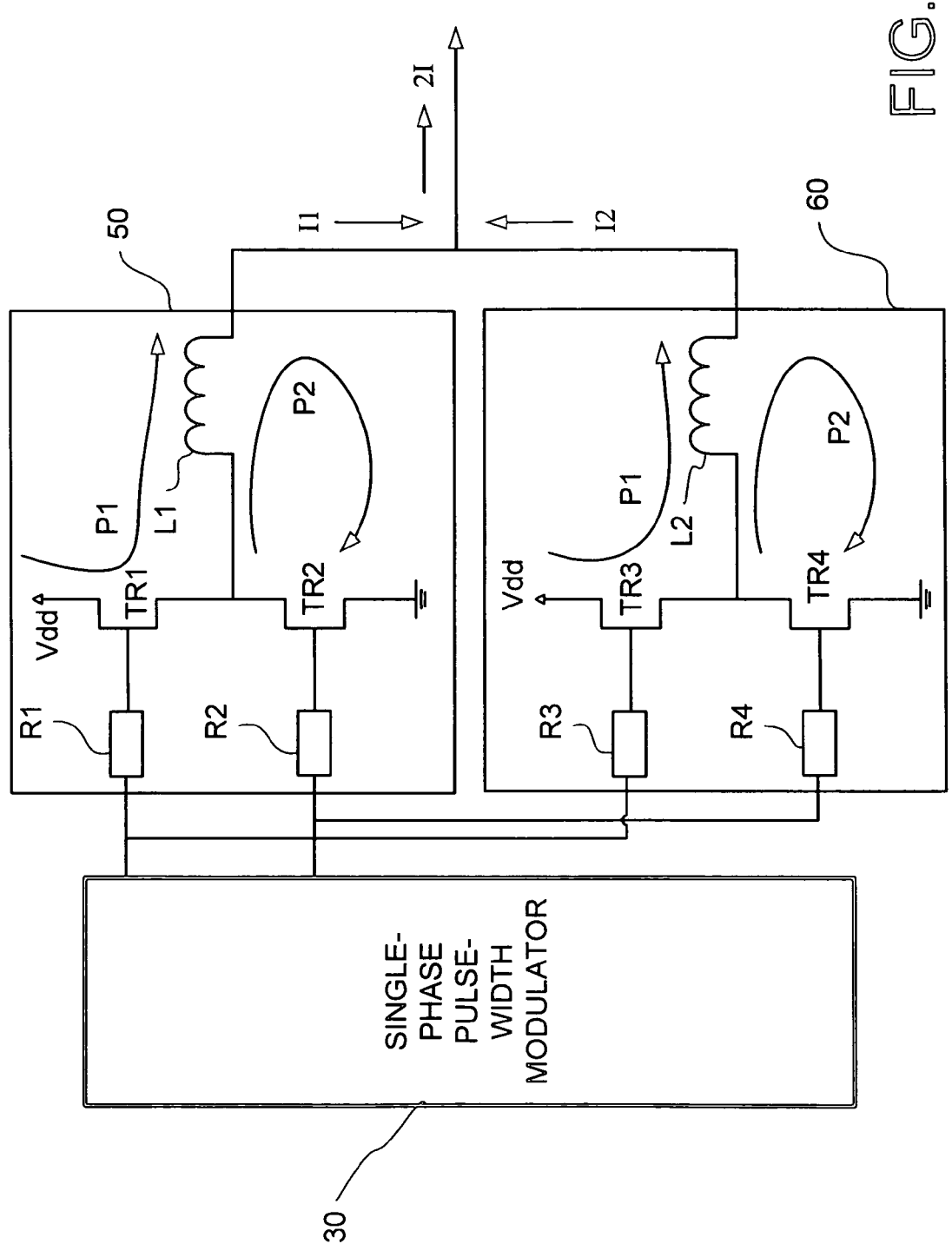
FIG. 3 is a power converter as a first embodiment of the invention.

As shown in FIG. 3, a first embodiment of the invention, a synchronized parallel running power converter includes a first power converter 50 and a second power converter 60 controlled by a single-phase pulse-width modulator 30. The single-phase pulse-width modulator 30 has a first pulse output port and a second pulse output port for pulse outputs. The first power converter 50 includes a first pulse input port, a second pulse input port and a current output port. The first pulse input port is coupled to the first pulse output port of the single-phase pulse-width modulator 30. The second pulse input port is coupled to the second pulse output port of the single-phase pulse-width modulator 30.

The first power converter 50 at least includes a first transistor TR1, a second transistor TR2 and a first inductor L1. The drain terminal of the first transistor TR1 is connected to the power source Vdd. The source terminal of the first transistor TR1 is connected to the drain terminal of the second transistor TR2. The source terminal of the second transistor TR2 is connected to the ground. The pulse-width modulator 30 provides an oscillating pulse from the first pulse output port to the gate terminal of the first transistor TR1 via a first resistor R1. The pulse-width modulator 30 provides an oscillating pulse from the second pulse output port to the gate terminal of the second transistor TR2 via a second resistor R2. The first resistor R1 and the second resistor R2 are for current limitation in order to protect the transistors TR1 and TR2. The first inductor L1 is coupled between the source terminal of the first transistor TR1 and the current output port of the first power converter 50. The output current I1 of the first power converter 50 is provided from the current output port.

When the pulse of the pulse-width modulator 30 is at the positive cycle, the first transistor TR1 is on and the second transistor is off; a current flows through the first transistor TR1 to the first inductor L1, as the illustrated path P1, and stored energy in the first inductor L1. When the pulse of the pulse-width modulator 30 is at the negative cycle, the first transistor TR1 is off and the second transistor is on; the first inductor L1 releases energy through a reversed path P2.

The second power converter 60 at least includes a third transistor TR3, a fourth transistor TR4 and a second inductor L2. The drain terminal of the third transistor TR3 is connected to the power source Vdd. The source terminal of the third transistor TR3 is connected to the drain terminal of the fourth transistor TR4. The source terminal of the fourth transistor TR4 is connected to the ground. The pulse-width modulator 30 provides an oscillating pulse from the first pulse output port to the gate terminal of the third transistor TR3 via a third resistor R3. The pulse-width modulator 30 provides an oscillating pulse from the fourth pulse output port to the gate terminal of the fourth transistor TR4 via a fourth resistor R4. The third resistor R3 and the fourth resistor R4 are for current limitation in order to protect the transistors TR3 and TR4. The third inductor L3 is coupled between the source terminal of the third transistor TR3 and the current output port of the second power converter 60. The output current I2 of the second power converter 60 is provided from the current output port.

When the pulse of the pulse-width modulator 30 is at the positive cycle, the third transistor TR3 is on and the fourth transistor is off; a current flows through the third transistor TR3 to the second inductor L2, as the illustrated path P1, and stored energy in the second inductor L2. When the pulse of the pulse-width modulator 30 is at the negative cycle, the third transistor TR3 is off and the second transistor is on; the second inductor L2 releases energy through a reversed path P2.

The first, second, third and fourth transistors TR1, TR2, TR3 and TR4 are metallic oxide semiconductor field effect transistors (MOSFET).

In the embodiment of FIG. 3, two power converters run in parallel and synchronously so as to solve the problems of prior arts. The first and second inductors L1 and L2 store energy in the path P1, and release energy in the path P2. The invention connects the first pulse input ports of the two power converters 50, 60 to the first pulse output port of the single-phase pulse-width modulator 30 so that the first transistor TR1 of the first power converter 50 and the third transistor TR3 of the second power converter 60 can on and off synchronously; and the second transistor TR2 of the first power converter 50 and the fourth transistor TR4 of the second power converter 60 can on and off synchronously. As a result, the first power converter 50 and the second power converter 60 have a same pulse width and current output, and the total current output It=I1+I2=2I.

From the aforesaid first embodiment, we can see that only a pulse-width modulator is needed for controlling two power converters. In comparison to prior arts, the invention requires only one (half of prior arts) pulse-width modulator to obtain a same current output.

Figure 4:
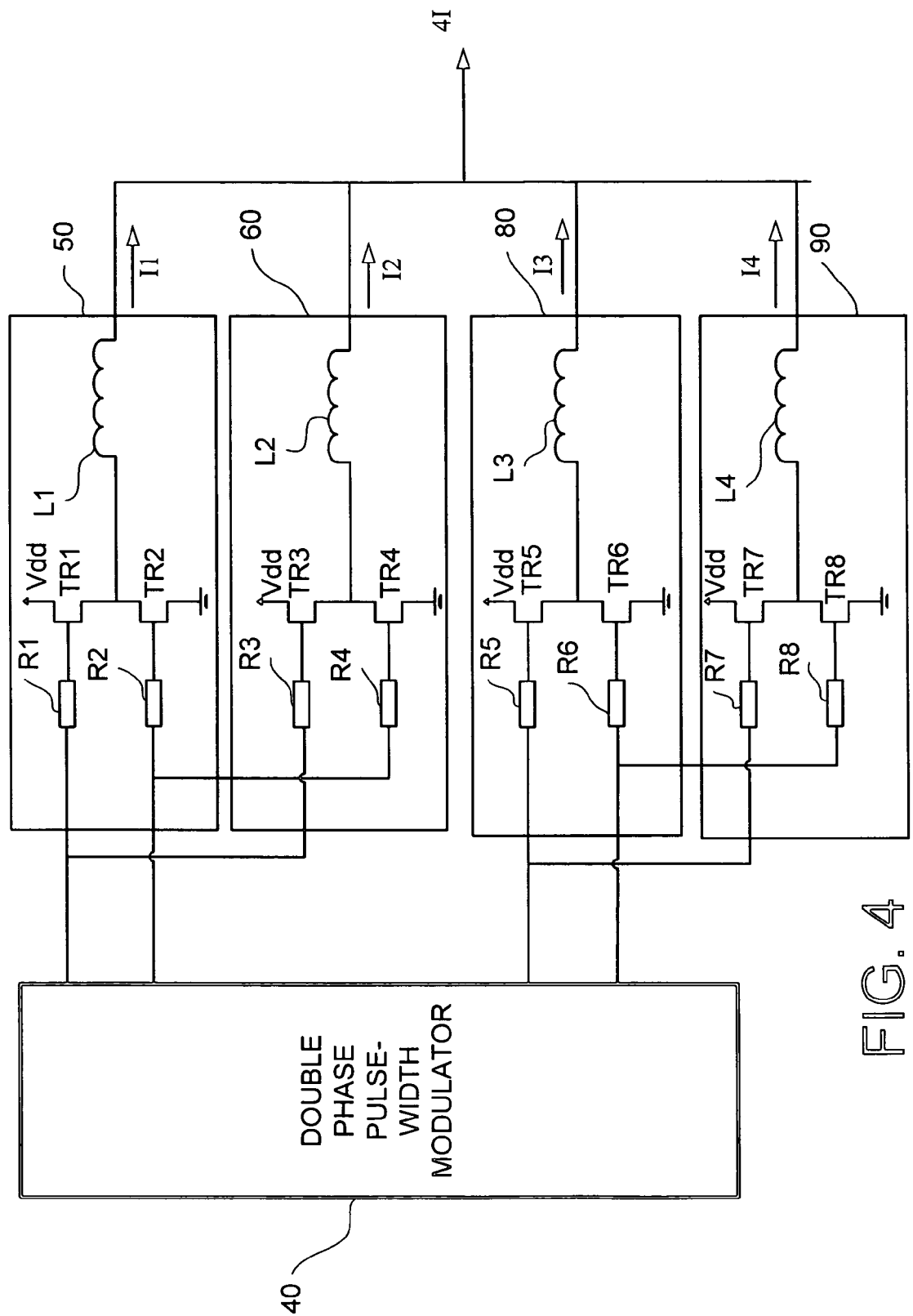
FIG. 4 is a power converter as a second embodiment of the invention.

As shown in FIG. 4, a second embodiment of the invention, a synchronized parallel running power converter includes four power converters 50, 60, 80 and 90 and a double-phase pulse-width modulator 40. The double-phase pulse-width modulator 40 has a first pulse output port, a second pulse output port, a third pulse output port and a fourth pulse output port for pulse outputs. The first power converter 50 includes a first pulse input port, a second pulse input port and a current output port. The first pulse input port is coupled to the first pulse output port of the double-phase pulse-width modulator 40. The second pulse input port is coupled to the second pulse output port of the double-phase pulse-width modulator 40. The second power converter 60 includes a first pulse input port, a second pulse input port and a current output port. The first pulse input port is coupled to the first pulse output port of the double-phase pulse-width modulator 40. The second pulse input port is coupled to the second pulse output port of the double-phase pulse-width modulator 40.

The third power converter 80 includes a first pulse input port, a second pulse input port and a current output port. The first pulse input port is coupled to the third pulse output port of the double-phase pulse-width modulator 40. The second pulse input port is coupled to the fourth pulse output port of the double-phase pulse-width modulator 40. The fourth power converter 90 includes a first pulse input port, a second pulse input port and a current output port. The first pulse input port is coupled to the third pulse output port of the double-phase pulse-width modulator 40. The second pulse input port is coupled to the fourth pulse output port of the double-phase pulse-width modulator 40.

The current output ports of the first, second, third and fourth power converters 50, 60, 80 and 90 are coupled together so that the total output current is It=I1+I2+I3+I4. Through the control of the double-phase pulse-width modulator 40, the currents I1, I2, I3 and I4 are equal and four times of the current is obtained.

The compositions of the first power converter 50 and the second power converter 60 are similar to that of the first embodiment. The third power converter 80 includes a fifth transistor TR5, a sixth transistor TR6, a fifth resister R5, a sixth resister R6 and a third inductor L3. The fourth power converter 90 includes a seventh transistor TR7, an eighth transistor TR8, an seventh resister R7, a eighth resister R8 and a fourth inductor L4. The composition and function of the third power converter 80 and the fourth power converter 90 are the same as that of the first embodiment.

From the aforesaid second embodiment, we can see that only two pulse-width modulators are needed for controlling four power converters. In comparison to prior arts, the invention requires only one (half of prior arts) pulse-width modulator to obtain a same current output.

The power converter of the invention not only saves the quantity of pulse-width modulators and saves the cost, but also balances the currents in the parallel paths.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synchronized parallel running power converter, controlled by a single-phase pulse-width modulator; said single-phase pulse-width modulator having a first pulse output port and a second pulse output port for pulse outputs, said power converter comprising:
   a first power converter, having a first pulse input port, a second pulse input port and a current output port; said first pulse input port is coupled to said first pulse output port of said single-phase pulse-width modulator; said second pulse input port is coupled to said second pulse output port of said single-phase pulse-width modulator; and
   a second power converter, having a first pulse input port, a second pulse input port and a current output port; said first pulse input port is coupled to said first pulse output port of said single-phase pulse-width modulator; said second pulse input port is coupled to said second pulse output port of said single-phase pulse-width modulator;
   wherein said power converters are synchronized by controlling said single-phase pulse-width modulator thereby equalizing the output currents from said current output ports.

2. The synchronized parallel running power converter according to claim 1 wherein said first power converter further comprises:
   a first transistor whose drain terminal electrically is connected to a power source and gate terminal electrically is connected to said first pulse output port of said single-phase pulse-width modulator;
   a second transistor whose drain terminal electrically is connected to the source terminal of said first transistor, whose source terminal electrically is connected to a ground, and whose gate terminal electrically connected to said second pulse output port of said pulse-width modulator; and
   a first inductor coupled between said source terminal of said first transistor and said current output port of said first power converter.

3. The synchronized parallel running power converter according to claim 2 wherein said gate terminal of said first transistor is electrically connected to said first pulse output port of said single-phase pulse-width modulator through a first resister.

4. The synchronized parallel running power converter according to claim 2 wherein said gate terminal of said second transistor is electrically connected to said second pulse output port of said single-phase pulse-width modulator through a second resister.

5. The synchronized parallel running power converter according to claim 1 wherein said second power converter further comprises:
   a third transistor whose drain terminal is electrically connected to a power source and gate terminal is electrically connected to said first pulse output port of said single-phase pulse-width modulator;
   a fourth transistor whose drain terminal is electrically connected to the source terminal of said third transistor, whose source terminal is electrically connected to a ground, and whose gate terminal is electrically connected to said second pulse output port of said pulse-width modulator; and
   a second inductor coupled between said source terminal of said third transistor and said current output port of said second power converter.

6. The synchronized parallel running power converter according to claim 5 wherein said gate terminal of said third transistor is electrically connected to said first pulse output port of said single-phase pulse-width modulator through a third resister.

7. The synchronized parallel running power converter according to claim 5 wherein said gate terminal of said fourth transistor is electrically connected to said second pulse output port of said single-phase pulse-width modulator through a fourth resister.

8. A synchronized parallel running power converter, controlled by a double-phase pulse-width modulator, said double-phase pulse-width modulator having a first pulse output port, a second pulse output port, a third pulse output port and a fourth pulse output port for pulse outputs, said power converter comprising:
   a first power converter, having a first pulse input port, a second pulse input port and a current output port; said first pulse input port is coupled to said first pulse output port of said double-phase pulse-width modulator; said second pulse input port is coupled to said second pulse output port of said double-phase pulse-width modulator; and
   a second power converter, having a first pulse input port, a second pulse input port and a current output port; said first pulse input port is coupled to said first pulse output port of said double-phase pulse-width modulator; said second pulse input port is coupled to said second pulse output port of said double-phase pulse-width modulator;
   a third power converter, having a first pulse input port, a second pulse input port and a current output port; said first pulse input port is coupled to said third pulse output port of said double-phase pulse-width modulator; said second pulse input port is coupled to said fourth pulse output port of said double-phase pulse-width modulator; and
   a fourth power converter, having a first pulse input port, a second pulse input port and a current output port; said first pulse input port is coupled to said third pulse output port of said double-phase pulse-width modulator; said second pulse input port is coupled to said fourth pulse output port of said double-phase pulse-width modulator;

wherein said power converters are synchronized by controlling said double-phase pulse-width modulator thereby equalizing the output currents from said current output ports.

9. The synchronized parallel running power converter according to claim 8 wherein said first power converter further comprises:
 a first transistor whose drain terminal is electrically connected to a power source, and whose gate terminal is electrically connected to said first pulse output port of said double-phase pulse-width modulator;
 a second transistor whose drain terminal is electrically connected to the source terminal of said first transistor, whose source terminal is electrically connected to a ground, and whose gate terminal is electrically connected to said second pulse output port of said pulse-width modulator; and
 a first inductor coupled between said source terminal of said first transistor and said current output port of said first power converter.

10. The synchronized parallel running power converter according to claim 9 wherein said gate terminal of said first transistor is electrically connected to said first pulse output port of said double-phase pulse-width modulator through a first resister.

11. The synchronized parallel running power converter according to claim 9 wherein said gate terminal of said second transistor is electrically connected to said second pulse output port of said double-phase pulse-width modulator through a second resister.

12. The synchronized parallel running power converter according to claim 8 wherein said second power converter further comprises:
 a third transistor whose drain terminal is electrically connected to a power source, and whose gate terminal is electrically connected to said first pulse output port of said double-phase pulse-width modulator;
 a fourth transistor whose drain terminal is electrically connected to the source terminal of said third transistor, whose source terminal is electrically connected to a ground, and whose gate terminal is electrically connected to said second pulse output port of said pulse-width modulator; and
 a second inductor coupled between said source terminal of said third transistor and said current output port of said second power converter.

13. The synchronized parallel running power converter according to claim 12 wherein said gate terminal of said third transistor is electrically connected to said first pulse output port of said double-phase pulse-width modulator through a third resister.

14. The synchronized parallel running power converter according to claim 12 wherein said gate terminal of said fourth transistor is electrically connected to said second pulse output port of said double-phase pulse-width modulator through a fourth resister.

15. The synchronized parallel running power converter according to claim 8 wherein said third power converter further comprises:
 a fifth transistor whose drain terminal is electrically connected to a power source, and whose gate terminal is electrically connected to said first pulse output port of said double-phase pulse-width modulator;
 a sixth transistor whose drain terminal is electrically connected to a source terminal of said fifth transistor, whose source terminal is electrically connected to a ground, and gate terminal is electrically connected to said third pulse output port of said pulse-width modulator; and
 a third inductor coupled between said source terminal of said fifth transistor and said current output port of said third power converter.

16. The synchronized parallel running power converter according to claim 15 wherein said gate terminal of said fifth transistor is electrically connected to said third pulse output port of said double-phase pulse-width modulator through a fifth resister.

17. The synchronized parallel running power converter according to claim 15 wherein said gate terminal of said sixth transistor is electrically connected to said fourth pulse output port of said double-phase pulse-width modulator through a sixth resister.

18. The synchronized parallel running power converter according to claim 8 wherein said fourth power converter further comprises:
 a seventh transistor, whose drain terminal is electrically connected to a power source, and whose gate terminal is electrically connected to said third pulse output port of said double-phase pulse-width modulator;
 a eighth transistor whose drain terminal is electrically connected to a source terminal of said seventh transistor, whose source terminal is electrically connected to a ground, and gate terminal is electrically connected to said fourth pulse output port of said pulse-width modulator; and
 a fourth inductor coupled between said source terminal of said seventh transistor and said current output port of said fourth power converter.

19. The synchronized parallel running power converter according to claim 18 wherein said gate terminal of said seventh transistor is electrically connected to said third pulse output port of said double-phase pulse-width modulator through a seventh resister.

20. The synchronized parallel running power converter according to claim 18 wherein said gate terminal of said eighth transistor is electrically connected to said fourth pulse output port of said double-phase pulse-width modulator through a eighth resister.

* * * * *